(12) United States Patent
Fahy

(10) Patent No.: US 6,318,787 B1
(45) Date of Patent: Nov. 20, 2001

(54) AUTOMOBILE GLARE VISOR

(76) Inventor: Martin Fahy, 219 Cedar St., Ashland, MA (US) 01721

( * ) Notice: Subject to any disclaimer, the term of this patent is extended or adjusted under 35 U.S.C. 154(b) by 0 days.

(21) Appl. No.: 09/374,186

(22) Filed: Aug. 13, 1999

Related U.S. Application Data

(60) Provisional application No. 60/096,493, filed on Aug. 14, 1998.

(51) Int. Cl.$^7$ ........................................................ B60J 3/00
(52) U.S. Cl. ........................ 296/97.2; 296/97.3; 296/97.6
(58) Field of Search ................................. 296/97.2, 97.3, 296/97.6

(56) References Cited

U.S. PATENT DOCUMENTS

| | | | |
|---|---|---|---|
| 1,468,750 | * | 9/1923 | Sechrist ................................ 296/97.2 |
| 1,868,031 | * | 7/1932 | Sudbrink ............................. 296/97.2 |
| 2,204,691 | * | 6/1940 | Olsen .................................... 296/97.2 |
| 2,220,429 | * | 11/1940 | Soderberg .......................... 296/97.2 |
| 2,324,469 | * | 7/1943 | Brunson .............................. 296/97.2 |
| 2,458,125 | * | 1/1949 | Winkler ................................ 296/97.2 |
| 2,605,133 | * | 7/1952 | Newton ................................ 296/97.2 |
| 2,833,591 | * | 5/1958 | Kurtzke .................................. 296/97 |
| 3,351,375 | * | 11/1967 | Wheeler .................................. 296/97 |
| 3,445,135 | * | 5/1969 | Masi ..................................... 296/97.3 |
| 4,999,746 | * | 3/1991 | Svensson ............................ 296/97.2 |

FOREIGN PATENT DOCUMENTS

| | | | |
|---|---|---|---|
| 0723548 | * | 8/1942 | (DE) ................................... 296/97.2 |
| 1090573 | * | 3/1955 | (FR) .................................... 296/97.2 |
| 2115047 | * | 7/1972 | (FR) .................................... 296/97.2 |
| 2284474 | * | 4/1976 | (FR) .................................... 296/97.2 |
| 1144809 | * | 3/1969 | (GB) ................................... 296/97.3 |
| 406072151 | * | 3/1994 | (JP) ..................................... 296/97.2 |

* cited by examiner

*Primary Examiner*—Joseph D. Pape
*Assistant Examiner*—Kiran B. Patel

(57) ABSTRACT

An automobile accessory for use by a driver at night to filter and dim the view of all headlights ahead as they approach and pass by. This simple easy to use glare visor has an unusual shape comprising a predetermined sloping bottom edge which from a driver's view seated behind the steering wheel follows the relative path of all headlights in the opposite lane. A driver always looks under the bottom edge of this glare visor for an unfiltered normal view ahead while simultaneously receiving a filtered view of all headlights. This glare visor frictionally rotates independently on conventional hinge type clips that easily slide onto and grip a vehicle sun visor.

3 Claims, 1 Drawing Sheet

AUTOMOBILE GLARE VISOR

Previous provisional application 60/096,493 filed Aug. 14, 1998.

FIELD OF INVENTION

This invention relates to automobile visors, specifically to a transparent glare visor that filters and dims a driver's view of headlights at night.

BACKGROUND OF INVENTION

Drivers at night face bright headlights from opposing traffic. Modern vehicles have brighter headlights in general and many are placed at a higher level. A large percentage of vehicles also have headlights that are either misdirected, out of alignment, or on high beam. Meanwhile the number of registered vehicles and volume of traffic is always increasing. As a consequence anyone who is sensitive to bright lights is often distracted when driving at night. Such a driver needs a means of self-defense and sense of control over these conditions. Current transparent rectangular visors are used in the daytime as sum visor extensions but are not perfectly suited for use at night to dim a driver's view of headlights. These rectangular visors darken a driver's whole view if lowered enough to completely filter headlights. Some rectangular visors are made of a lighter optical material but these do not sufficiently dim the driver's view of headlights. Prior art patents for the purpose of reducing headlight glare such as U.S. Pat No. 4,818,011 4/89 Cherian, 3,695,658 10/72 Vacha, 3,351,375 11/67 Wheeler and 2,833,591 5/58 Kurtzke, all have inherent limitations in their structure and use.

SUMMARY OF INVENTION

Accordingly, the object and advantage of the present invention is to provide a driver with a simple inexpensive automobile accessory that easily slides onto an automobile sun visor and is there ready for use whenever needed to filter and dim the view of bright glaring headlights at night. An accessory simple and easy to use that improves a driver's vision safety and comfort when driving at night. The present glare visor pleasantly filters and dims a driver's view of all headlights ahead without obstructing the driver's view of the road and traffic. Using the glare visor relieves eyestrain and discomfort for glare sensitive drivers. From the driver's position the unusual shape of the glare visor underside follows the relative path of vehicle headlights as they approach and pass. All the driver has to do is look under the bottom edge of the glare visor for a normal unfiltered view while receiving a filtered and dimmed view of objectionable headlights.

DESCRIPTION OF DRAWINGS

FIG. 2 shows a front view of a similar embodiment.

FIG. 3 shows a front view of another similar embodiment.

DETAILED DESCRIPTION

Figure 1:
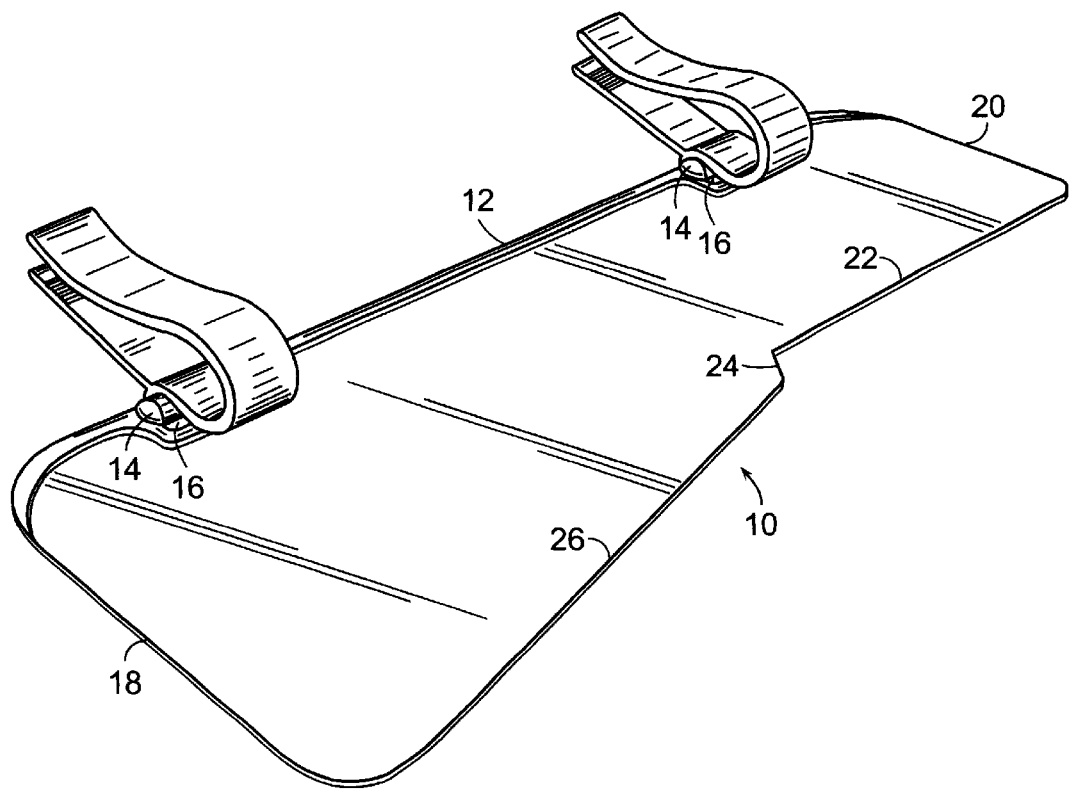
FIG. 1 shows a front and top view of the preferred embodiment of the present invention.

The preferred embodiment of glare visor 10 as shown in FIG. 1 includes a mostly flat body of colored transparent plastic. The horizontal top edge 12 is 10½" long. Disposed along top edge 12 are two conventional round areas that function as hinge pins for frictional rotation on hinge type clips (not Shown). A rectangular space 16 below each round area allows rotation. The left side edge 18 is 4¼" long. The right side edge 20 is 2⅝" long. Both edges are shown slanting outward but can vary. The underside of visor 10 has a horizontal edge section 22 that is 3⅞" long and partly parallel with top edge 12. The middle edge section 24 declines from horizontal edge section 22 at an approximate angle of 135 degrees and is ⅜" long. Middle edge section 24 allows horizontal edge 22 to be at the optimum level and bottom sloping edge 26 to be at the optimum angle. The bottom sloping edge 26 declines from middle section 24 at an approximate angle of 145 degrees and is 7⅜" long. The corners of visor 10 are shown rounded off but can vary. Visor 10 can be made longer or wider but the overall shape must be kept in proportion. The underside dimensions and angles of visor 10 are related and can not be changed without affecting the view a driver receives when using visor 10. It should be noted that the relative positions of a transparent visor and a driver looking through it at passing headlights are absolutely necessary in determining what shape the bottom edge of the transparent visor has to be in order to follow the path of the passing headlights.

A similar embodiment is shown in FIG. 2 wherein the underside has a horizontal edge 15 and a sloping bottom edge 17. If edge 17 was the same angle as edge 26 in FIG. 1 this visor shape would be effective in filtering a driver's view of headlights, but edge 15 would limit the extent of the driver's unfiltered view ahead.

Another similar embodiment is shown in FIG. 3 wherein the underside is a continuous sloping bottom edge 19. If edge 19 was the same angle as edge 26 in FIG. 1 this visor shape would be effective in filtering a driver's view of headlights on a straight or left curving road but would not filter the driver's view of headlights at a distance or on a right curving road. The body of visor 10 is molded from suitable plastic material, and conventional hinge type clips are assembled to it afterward.

Operation

Glare visor 10 is clipped onto the free edge of a vehicle sun visor and centered above the vehicle steering wheel. The method of use is as follows: A driver lowers the vehicle sun visor above eye level then lowers visor 10 to receive a filtered view of headlights which appear just above the edge of sloping bottom edge 26, which is angled to follow the path of the headlights. At the same time, the driver has an unfiltered view of the opposite lane and the rest of the road by looking under the edge of sloping bottom edge 26. The rest of the visor over horizontal edge 22 filters the driver's view of headlights at a distance and when the road curves to the right. Looking under horizontal edge 22 gives the driver an extensive unfiltered view. The driver can increase or decrease the amount of view that is filtered or unfiltered instantly with a slight head movement and can make adjustments by moving either visor 10 or the sun visor or both. For the initial positioning of glare visor 10 on the sun visor, middle edge 24 should approximately line up with the road centerline, but subsequently will vary due to road course and driver head movement. At all times the driver concentrates on looking under glare visor 10 for an unfiltered view of the road while receiving a filtered and dimmed view of all headlights.

While there has been shown and described here what are considered at present to be the preferred embodiments of the present invention, it will be appreciated that modifications of such embodiments may be made by those skilled in the art. It is therefore desired that the invention not be limited to these embodiments. It is intended to cover in the appended claims all such modifications as fill within the true spirit and scope of the present invention.

I claim:

1. In combination with a vehicle sun visor, an automobile glare visor for use by a driver, comprising a mostly flat transparent body substantially formed by a horizontally extended top edge, disposed thereon, means to clip onto said vehicle sun visor, a downward extended left side edge, a downward extended right side edge, a bottom edge comprising a section extending inwardly from said downward extended right side edge, a sloping section extending downward toward said downward extended left side edge.

2. In combination with a vehicle sun visor, an automobile glare visor for use by a driver, comprising a mostly flat transparent body substantially formed by a horizontally extended top edge, disposed thereon, means to clip onto said vehicle sun visor, a downward extended left side edge, a downward extended right side edge, a bottom edge comprising a section extending inwardly from said downward extended right side edge, an intermediate section, a sloping section extending downward toward said downward extended left side edge.

3. A method of filtering and dimming a driver's view of vehicle headlights at night during their approach and passing in the opposite lane of traffic which simultaneously allows said driver to have a sufficiently clear view of the road and area ahead comprising the steps of:

(a) providing a transparent automobile glare visor comprising a shape which during said driver's use, and from said driver's view, relatively corresponds to the travel of said vehicle headlights in the opposite lane of traffic as they approach and pass by, (b) placing said transparent automobile glare visor in position to filter and dim said driver's view of said vehicle headlights in the opposite lane of traffic, simultaneously allowing said driver a sufficiently clear unfiltered view of the road area ahead, (c) instructing said driver to look under said transparent automobile glare visor for a clear view of the road while receiving a filtered, dimmed view of said vehicle headlights in the opposite lane.

* * * * *